United States Patent
Calvet et al.

(10) Patent No.: US 6,546,182 B2
(45) Date of Patent: Apr. 8, 2003

(54) ANGLED FIBER TERMINATION AND METHODS OF MAKING THE SAME

(75) Inventors: Robert John Calvet, Pasadena, CA (US); Stephen Eric Vargo, Pasadena, CA (US); Roman Carlos Gutierrez, La Crescenta, CA (US)

(73) Assignee: Siwave, Inc., Arcadia, CA (US)

( * ) Notice: Subject to any disclaimer, the term of this patent is extended or adjusted under 35 U.S.C. 154(b) by 0 days.

(21) Appl. No.: 09/855,305

(22) Filed: May 15, 2001

(65) Prior Publication Data

US 2002/0172491 A1 Nov. 21, 2002

(51) Int. Cl.[7] .................................................. G02B 6/00
(52) U.S. Cl. .......................................... 385/139; 385/67
(58) Field of Search ............................ 385/139, 67, 133, 385/134

(56) References Cited

U.S. PATENT DOCUMENTS

| | | | | |
|---|---|---|---|---|
| 4,721,357 A | * | 1/1988 | Kovalchick et al. | 385/25 |
| 4,948,219 A | * | 8/1990 | Seino et al. | 385/95 |
| 5,062,682 A | * | 11/1991 | Marazzi | 385/85 |
| 5,131,745 A | * | 7/1992 | Whitney et al. | 356/153 |
| 5,394,498 A | | 2/1995 | Hinterlong et al. | 385/115 |
| 5,412,747 A | * | 5/1995 | Matsuoka et al. | 385/85 |
| 5,463,709 A | * | 10/1995 | Terao et al. | 385/85 |
| 5,550,942 A | | 8/1996 | Sheem | 285/53 |
| 5,566,262 A | | 10/1996 | Yamane et al. | 385/33 |
| 5,701,381 A | * | 12/1997 | Saurenbach et al. | 385/139 |
| 5,768,464 A | * | 6/1998 | Leonard | 385/139 |
| 5,907,650 A | | 5/1999 | Sherman et al. | 385/80 |
| 6,273,783 B1 | * | 8/2001 | Kim | 451/8 |

* cited by examiner

Primary Examiner—Lynn Field
Assistant Examiner—Michael C. Zarroli
(74) Attorney, Agent, or Firm—Fish & Richardson P.C.

(57) ABSTRACT

Angled fiber terminations and methods of making the angled fiber terminations. One aspect relates to an optical fiber support assembly. The assembly comprises a substrate with a hole formed in the substrate. The hole comprises at least one non-circular opening. The hole is configured to receive a tip of a fiber such that an angle between an axis of the fiber tip and a normal of a surface of the substrate is greater than zero.

37 Claims, 6 Drawing Sheets

US 6,546,182 B2

ANGLED FIBER TERMINATION AND METHODS OF MAKING THE SAME

INCORPORATION BY REFERENCE

A co-assigned U.S. patent application, entitled "HIGH DENSITY FIBER TERMINATOR/CONNECTOR" (Ser. No. 09/855,406), filed on May 15, 2001, is hereby incorporated by reference in its entirety.

BACKGROUND OF THE INVENTION

1. Field of the Invention

The present invention relates to fiber optic terminators, and more particularly to an angled fiber terminator.

2. Description of the Related Art

Optical fibers are used to transmit signals. Common fiber optic terminations/connectors terminate one fiber at a time. There are several connector styles (e.g., FC/PC, LC), but in all cases, a single fiber is inserted and glued in a precision ferrule, which is typically made of ceramic. The end of the ferrule and fiber are polished together to provide a smooth surface or a desired shape.

SUMMARY OF THE INVENTION

Angled fiber terminations and methods of making the same are provided in accordance with the present invention. In one embodiment, a structural system aligns and holds optical fibers in a substrate prior to a bonding process. When the fibers are glued in position and an optical face of the substrate is polished, the fiber termination will have one or more properties. For example, one property relates to an input/output point of each fiber (i.e., a polished face of the fiber core) that is located with a high degree of accuracy in the optical face of the substrate.

Another property relates to an optical axis of each fiber core that is positioned at a well-defined angle with respect to a surface normal of the polished face of the fiber and the optical face of the substrate. This property minimizes back-reflection and accurately defines the input/output angle of each fiber.

Another property relates to a plurality of fibers that are robustly supported by a structure, such that positional changes of their respective fiber bodies or 'pigtails' will not cause changes in coupling efficiency, transmission loss, or damage to the fibers.

Another property relates to scalability of the assembly to support a fiber termination with a large number of fibers.

In one embodiment, kinematic supports may be implemented in a fiber termination, but a fiber should not be considered a rigid body. The body of a fiber engaged in an alignment assembly should be considered to have more than six independent degrees of freedom (DOF). Degrees of freedom beyond the normal six are deflected shapes that can be considered as normal modes of the fiber, i.e., an orthogonal set of elastically deflected states. One aspect of the present invention provides a support assembly that (1) supports the rigid body degrees of freedom, (2) controls the most dominant elastic modes, and (3) prevents non-negligible elastic modes.

One aspect relates to an optical fiber support assembly. The assembly comprises a substrate with a hole formed in the substrate. The hole comprises at least one noncircular opening. The hole is configured to receive a tip of a fiber such that an angle between an axis of the fiber tip and a normal of a surface of the substrate is greater than zero.

In one embodiment, the assembly comprises three structures. A first structure, such as a silicon substrate, locally controls the lateral positions of a plurality of fiber tips and an angle between an axis of each fiber tip and a normal of a surface of the first structure. A second structure, such as a locator plate, controls a lateral position of each fiber body behind the first structure. A third structure, such as a removable alignment fixture, may control a lateral position and a tilt of each fiber body at some location behind the second structure. A part of the assembly may then be bonded. In one embodiment, the bonding comprises filling a space defined by the first structure and the second structure with glue. The first structure, the second structure, and glue fill may control substantially all rigid body motion and all critical elastic modes of each fiber.

Another aspect of the invention relates to a method of supporting at least one optical fiber. The method comprises inserting a tip of the fiber into a hole in a first structure; and applying a load to a body of the fiber such that an axis of the fiber tip is at an angle with respect to a normal of a surface of the first structure.

DETAILED DESCRIPTION

Figure 1B:
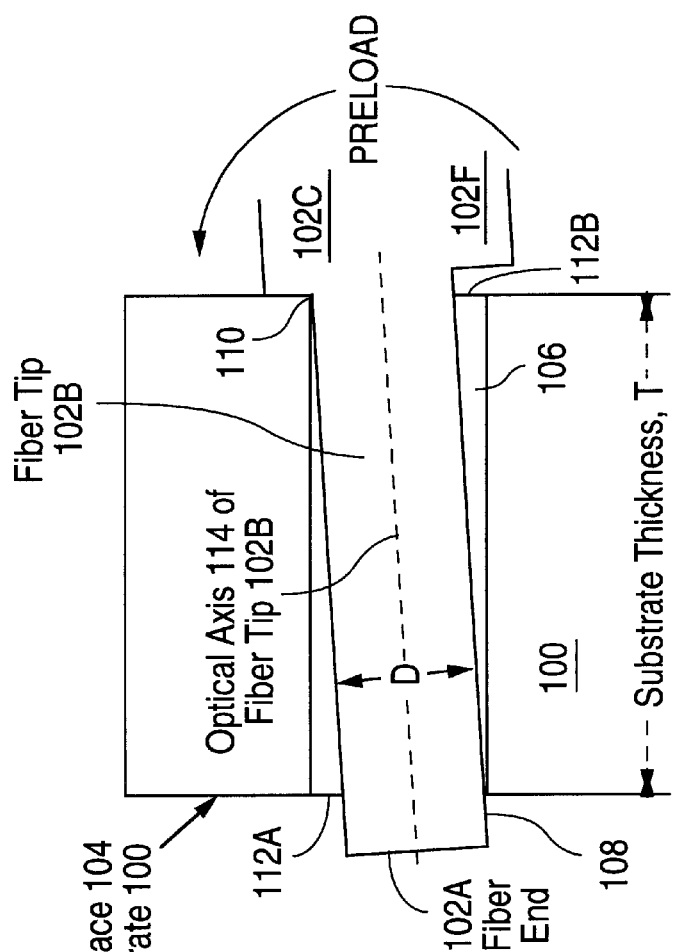
FIGS. 1A and 1B illustrate one embodiment of a substrate that locally controls a lateral position of a fiber tip and an angle between an axis of the fiber tip and a surface normal of the substrate.
Figure 1A:
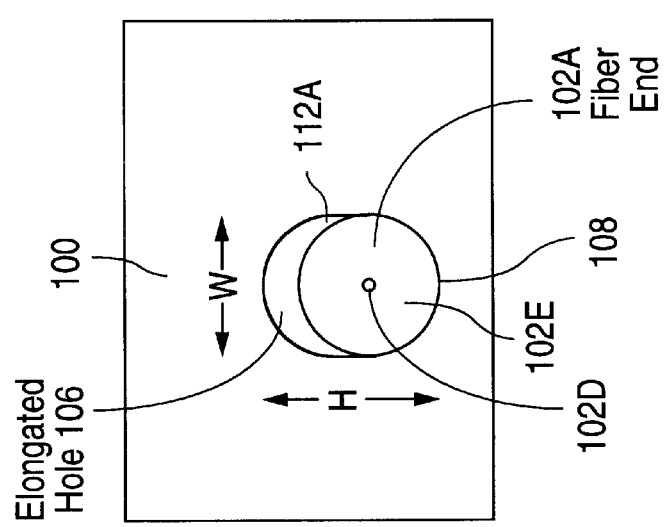

FIGS. 1A and 1B illustrate one embodiment of a substrate 100 that locally controls a lateral position of a fiber tip 102B and an angle between an axis 114 of the fiber tip 102B and a normal vector of a surface 104 of the substrate 100 (also called 'substrate face 104' or 'optical face 104' of the substrate 100'). FIG. 1A is a front view of the substrate face 104, and FIG. 1B is a cross-sectional side view of the substrate 100.

A 'fiber' comprises a fiber tip 102B (FIG. 1B) and a fiber body 102C (FIG. 1B). As shown in FIG. 1A, the fiber tip 102B comprises a fiber end 102A, a core 102D and a cladding 102E. The core 102D comprises an inner portion of the fiber, and the cladding 102E comprises a portion around the core 102D. In one embodiment, the core 102D and the cladding 102E comprise a substantially similar material, such as glass, but have one or more different optical properties, such as indices of refraction. In another embodiment, the core 102D and the cladding 102E comprise different types of materials. The fiber body 102C comprises the core 102D and the cladding 102E of the fiber tip 102B plus an exterior buffer or shielding 102F around the cladding 102D. In general, a fiber can have multiple claddings, as well as multiple cores.

In FIGS. 1A and 1B, the substrate 100 may comprise silicon, glass or some other suitable material. The substrate 100 comprises an elongated hole 106. The substrate 100 and the hole 106 may be formed by one or more processes described in a co-assigned U.S. Patent Application, entitled "HIGH DENSITY FIBER TERMINATOR/CONNECTOR" (Attorney Docket No. M-9920), which is hereby incorporated by reference in its entirety. In one embodiment, the hole 106 is formed by deep reactive ion etching (DRIE) and photolithography. In one embodiment, the hole 106 is fabricated with a lithographic micromachining process where the machining is done from the optical side 104 of the substrate 100 so that a high level of accuracy is obtained.

The hole 106 in the substrate 100 comprises a first opening 112A on the optical face 104 of the substrate 100 and a second opening 112B on an opposite side of the optical face 104. In one embodiment, the cross-sectional shape of the hole 106 comprises two half circles and an elongated portion between the two half circles. In other embodiments, the cross-sectional shape of the hole 106 may comprise an oval, a rectangle, a triangle, a pentagon, a hexagon or some other shape.

In one embodiment, the first opening 112A and the second opening 112B may have different shapes and/or sizes. In one embodiment, the first opening 112A is shaped and/or sized to fit a fiber tip 102C snuggly, while the second opening 112B is elongated to allow the fiber tip 102C to enter the hole 106 at an angle. In one embodiment, the different shape and/or size of the first and second openings 112A, 112B gradually become equal in the hole 106 close to the front substrate surface 104 of the substrate 100.

Regardless of the cross-sectional shape of the hole 106, a first dimension, such as an elongated height H of the hole 106 (as shown in FIG. 1A), is greater than a second dimension, such as a width W of the hole 106. In one embodiment, the elongated height H of the hole 106 may range from about 160 micrometers to about 195 micrometers. In other embodiments, the elongated height H of the hole 106 is less than 160 micrometers or greater than 195 micrometers. In one embodiment, the width W of the hole 106 is about 127 micrometers. In other embodiments, the width W of the hole 106 is greater than or less than 127 micrometers. In one embodiment, the diameter D of the fiber tip 102C (i.e., diameter of the fiber cladding 102E) is about 125 micrometers.

The shape and the size (e.g., height H and width W) of the hole 106 are configured to precisely constrain the position of the fiber tip 102B and an angle between the axis 114 of the fiber tip 102B and the normal vector of the substrate surface 104. In one embodiment, the height H of the hole 106 is equal to the diameter D of the fiber tip 102B plus the product of a thickness T of the substrate 100 and the tangent of a desired angle (theta) between the fiber tip axis 114 and the surface normal of the substrate surface 104.

$$H = D_{fiber\ tip} + (T_{substrate} \times TAN(theta))$$

In one embodiment, the angle (theta) is about 4 degrees, the thickness T of the substrate 100 is about 500 micrometers, the diameter D of the fiber tip 102B is about 25 micrometers, and the height H of the hole 106 is about 60 micrometers. In another embodiment, the angle (theta) is about 8 degrees, the thickness T of the substrate 100 is about 500 micrometers, the diameter D of the fiber tip 102B is about 25 micrometers, and the height H of the hole 106 is about 95 micrometers. In other embodiments, the angle (theta), the thickness T of the substrate 100 and the diameter D of the fiber tip 102B may comprise other values.

In one embodiment, the angle (theta) is about 4 degrees, the thickness T of the substrate 100 is about 500 micrometers, the diameter D of the fiber tip 102B is about 125 micrometers, and the height H of the hole 106 is about 60 micrometers. In another embodiment, the angle (theta) is about 8 degrees, the thickness T of the substrate 100 is about 500 micrometers, the diameter D of the fiber tip 102B is about 25 micrometers, and the height H of the hole 106 is about 95 micrometers. In other embodiments, the angle (theta), the thickness T of the substrate 100 and the diameter D of the fiber tip 102B may comprise other values.

Figure 2:
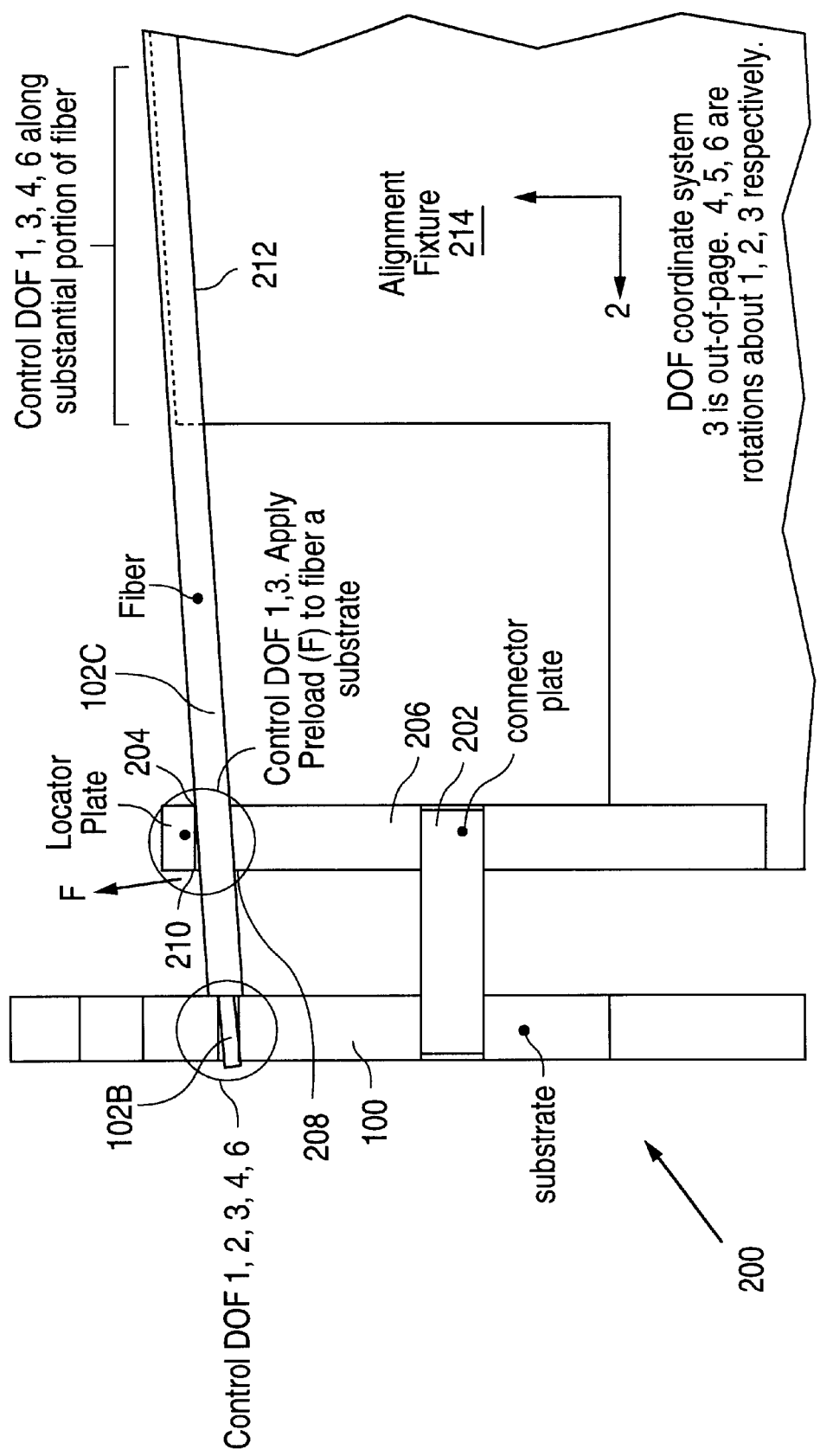
FIG. 2 illustrates one embodiment of an assembly configured to support the fiber body in FIG. 1 prior to a bonding process.

FIG. 2 illustrates one embodiment of an assembly 200 configured to support a fiber body 102C prior to a bonding process. The assembly 200 in FIG. 2 comprises a substrate 100, a connector plate 202, a locator plate 206 and an alignment fixture 214. The connector plate 202 may be glued, bonded, or otherwise attached to the substrate 100 and the locator plate 206.

In another embodiment, the substrate 100, the connector plate 202 and the locator plate 206 comprise a single integrated structure. In another embodiment, the connector plate 202 and the substrate 100 comprise a single integrated structure. In another embodiment, the connector plate 202 and the locator plate 206 comprise a single integrated structure. In one embodiment, the spacing between the substrate 100 and the locator plate 206 is about 1 mm. In other embodiments, the spacing between the substrate 100 and the locator plate 206 may be greater or less than 1 mm. In one embodiment, the alignment fixture 214 is removable from the locator plate 206.

The alignment fixture 214 may comprise any material that has a low coefficient of thermal expansion. For example, one embodiment of the alignment fixture 214 comprises stainless steel. In one embodiment, the alignment fixture 214 comprises a shallow groove 212. In one embodiment, the length of the groove 212 is equal to several fiber tip diameters to support the fiber body 102C and prevent elastic displacement, as described below with reference to FIGS. 3A–3F. In one embodiment, the length of the groove 212 is equal to four fiber tip diameters. In one embodiment, the length of the groove 212 is equal to 20 fiber tip diameters. In other embodiments, the alignment fixture 214 comprises a channel, a hole or some other feature, instead of a groove 212.

The groove 212 is configured to align the fiber body 102C as the fiber body 102C is inserted through the hole 210 in the locator plate 206 and the fiber tip 102B is inserted through the hole 106 in the substrate 100. In one embodiment, the shallow groove 212 supports the fiber body 102C at a desired angle. In one embodiment, the angle of an axis of the fiber body 102C along the shallow groove 212 to a normal of the substrate surface 104 is 8.5 degrees. In another embodiment, the angle is 8.25 degrees. In another embodiment, the angle is 4.0 degrees. In other embodiments, the angle may comprise any desired value.

In one embodiment, the alignment fixture 214 is positioned at a distance away from the locator plate 206 to allow space for a bonding agent to be applied to the locator plate 206, as described below with reference to FIG. 4.

In one embodiment, the fiber body 102C in FIG. 2 has six degrees of freedom. A first degree of freedom for the fiber body 102C may point up in FIG. 2, a second degree of freedom may point to the left, and a third degree of freedom may point out of the page toward the reader. Fourth, fifth and sixth degrees of freedom may be rotations (i.e., rotational degrees of freedom) around the first, second and third degrees of freedom, respectively.

As the fiber body 102C is translated to the left along the shallow groove 212 and inserted into the locator plate 206, the shallow groove 212 may control two translational degrees of freedom (e.g., first and third degrees of freedoms) and two rotational degrees of freedom (e.g., fourth and sixth degrees of freedom).

The locator plate 206 in FIG. 2 comprises a material, such as silicon, with a hole 210 formed in the material. The hole 210 comprises a first opening 208 facing the substrate 100 and a second opening 204 facing the alignment fixture 214. The hole 210 in the locator plate 206 may be formed by one or more processes described in the U.S. patent application, entitled "HIGH DENSITY FIBER TERMINATOR/CONNECTOR."In one embodiment, the hole 210 is an 'elongated' hole, which comprises a cross-sectional shape similar to the hole 106 (FIG. 1A) in the substrate, except the hole 210 in the locator plate 206 may be larger than the hole 106.

The length and diameter of the hole 210 in the locator plate 206 are configured to position the fiber body 102C at a desired angle with respect to a normal of the substrate surface 104. The angle may be 8.5 degrees, 8.25 degrees, 4 degrees or any other desired value. In addition, the vertical and horizontal position of the locator plate 206 may be adjusted to position the fiber body 102C at a desired angle with respect to a normal of the substrate surface 104.

In one embodiment, the locator plate 206 also applies the preload (FIG. 1B) at the fiber tip 102B by positioning the hole 210 to be slightly higher in the first degree of freedom than the hole 106 in the substrate 100. As the fiber body 102C is translated to the left in FIG. 2, the position of the hole 210 with respect to the hole 106 causes the fiber tip 102B to deflect elastically somewhat as the fiber tip 102B enters the hole 106. The positions of the holes 106 and 210 create a prying action on the fiber tip 102B in the substrate hole 106. The substrate hole 106 seats the fiber tip 102B against the control points 108, 110, as shown in FIG. 1B. Thus, in one embodiment, the preload causes the angle between of the fiber tip axis 114 (FIG. 1B) with respect to the normal of the substrate surface 104 to be 8 degrees, while the angle of the fiber body 102C with respect to the normal of the substrate surface 104 is 8.5 degrees.

In one embodiment, the preload is configured such that the difference between (1) the angle of the fiber tip axis 114 (FIG. 1B) with respect to the normal of the substrate surface 104 and (2) the angle of the fiber body 102C with respect to the normal of the substrate surface 104 is less than 1 degree.

In another embodiment, there is no elastic deflection of the fiber tip 102B. In this embodiment, the angle of the fiber tip axis 114 with respect to the normal of the substrate surface 104 is substantially equal to the angle of the fiber body axis with respect to the normal of the substrate surface 104.

The first and second openings 208, 204 of the hole 210 in the locator plate 206 may control two lateral degrees of freedom (e.g., first and third degrees of freedom). Thus, the first and second openings 208, 204 of the locator plate 206 constrain the angle of the fiber body 102C and the fiber tip 102B with respect to the normal of the substrate surface 104.

The locator plate 206 may also remove some undesired elastic deflections of the fiber body 102C.

In one embodiment, the hole 106 in the substrate 100, alone or in combination with the first and second openings 208, 204 in the locator plate 206, may control the first, second, third, fourth and sixth degrees of freedom. The fifth degree of freedom may be controlled by friction between the fiber tip 102B and the substrate 100 and friction between the fiber body 102C and the locator plate 206 and the alignment fixture 214. Thus, in one embodiment, the position of the holes 106, 210, the groove 212, the substrate 100, the locator plate 206 and the alignment fixture 214 control five or six degrees of freedom and control some or all significant elastic displacement modes of the fiber body 102C.

Figure 3A:
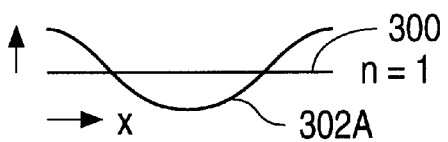
FIGS. 3A–3D illustrate examples of possible elastic displacement modes of an elongated body.
Figure 3B:
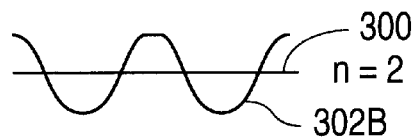

FIGS. 3A–3D illustrate examples of generalized elastic displacement modes of an elongated body, such as the fiber body 102C of FIG. 2. In FIGS. 3A–3D, the straight horizontal line 300 represents the fiber body 102C when there are no loads applied. 'W' represents the elastic displacement or deflection of lines 302A–302D, which represent the fiber body 102C as various loads are applied. In FIGS. 3A and 3B, 'W' may be expressed as:

$$W = A * \cos(n\pi x/L)$$

where 'A' represents a peak amplitude of displacement, 'n' represents an integer constant from 1 to infinity that defines an order of the elastic mode, 'x' represents a distance along the line 302, and 'L' represents the total length of the fiber body 102C.

Figure 3C:
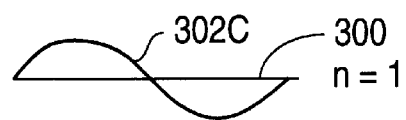
Figure 3D:
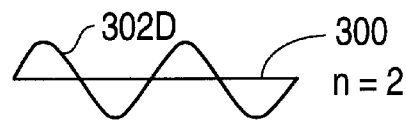

In FIGS. 3C and 3D, 'W' may be expressed as:

$$W = A * \sin(n\pi x/L)$$

Because 'n' can vary from 1 to infinity, there are a theoretically infinite number of elastic displacement modes.

In reality, the number of distinguishable modes has an upper limit where L/n approaches the diameter of the fiber body 102C. Also, forces that create these displacements are almost universally low-order, which means only a few lowest order modes typically exist. Actual shapes encountered in the real world most likely comprise two or more mode shapes in FIGS. 3A–3D superimposed on each other. But only the lowest spatial frequencies will most likely be encountered. Some typical shapes of the fiber body 102C are shown in FIGS. 3E and 3F.

Figure 3E:
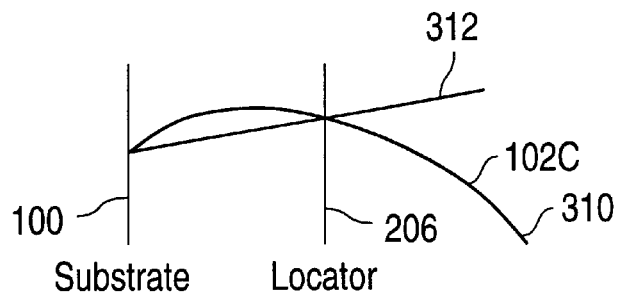
FIGS. 3E–3F illustrate examples of possible elastic displacement of an elongated body, such as the fiber body in FIG. 2.
Figure 3F:
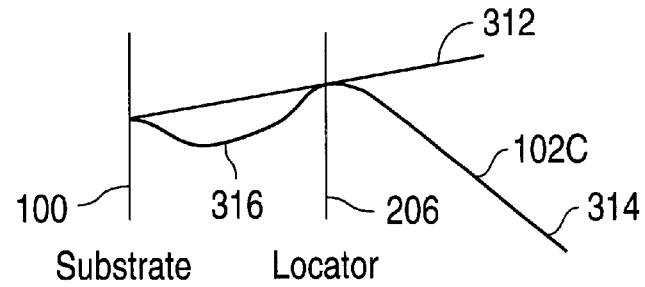

FIGS. 3E–3F illustrate examples of possible elastic displacement of an elongated body, such as a fiber body 102C in FIG. 2. In FIGS. 3E–3F, a straight line 312 represents an ideal position of the fiber body 102C with no loads applied. FIG. 3E illustrates a displacement mode of the fiber body 102C in FIG. 2 as a lateral downward load, such as gravity or a manually-applied force, is applied on a part 310 of the fiber body 102C somewhere to right of the locator plate 206.

FIG. 3F illustrates a displacement mode of the fiber body 102C in FIG. 2 as a first lateral load is applied at a first part 316 of the fiber body 102C and a second lateral load is applied at a second part 314 of the fiber body 102C. The first and second loads may be gravity.

Displacement modes due to the weight of the fiber body 102C, and any higher modes, may be neglected by configuring a separation between the substrate 100 (FIG. 2) and the locator plate 206 to be about 4 to about 8 fiber diameters. The addition of the alignment fixture 214 eliminates modes due to applied external loads on the fiber body 102C. After the fiber body 102C is bonded as described below with reference to FIG. 4, and rotational DOF are controlled at the locator plate 206, all displacement modes may be eliminated.

Figure 4:
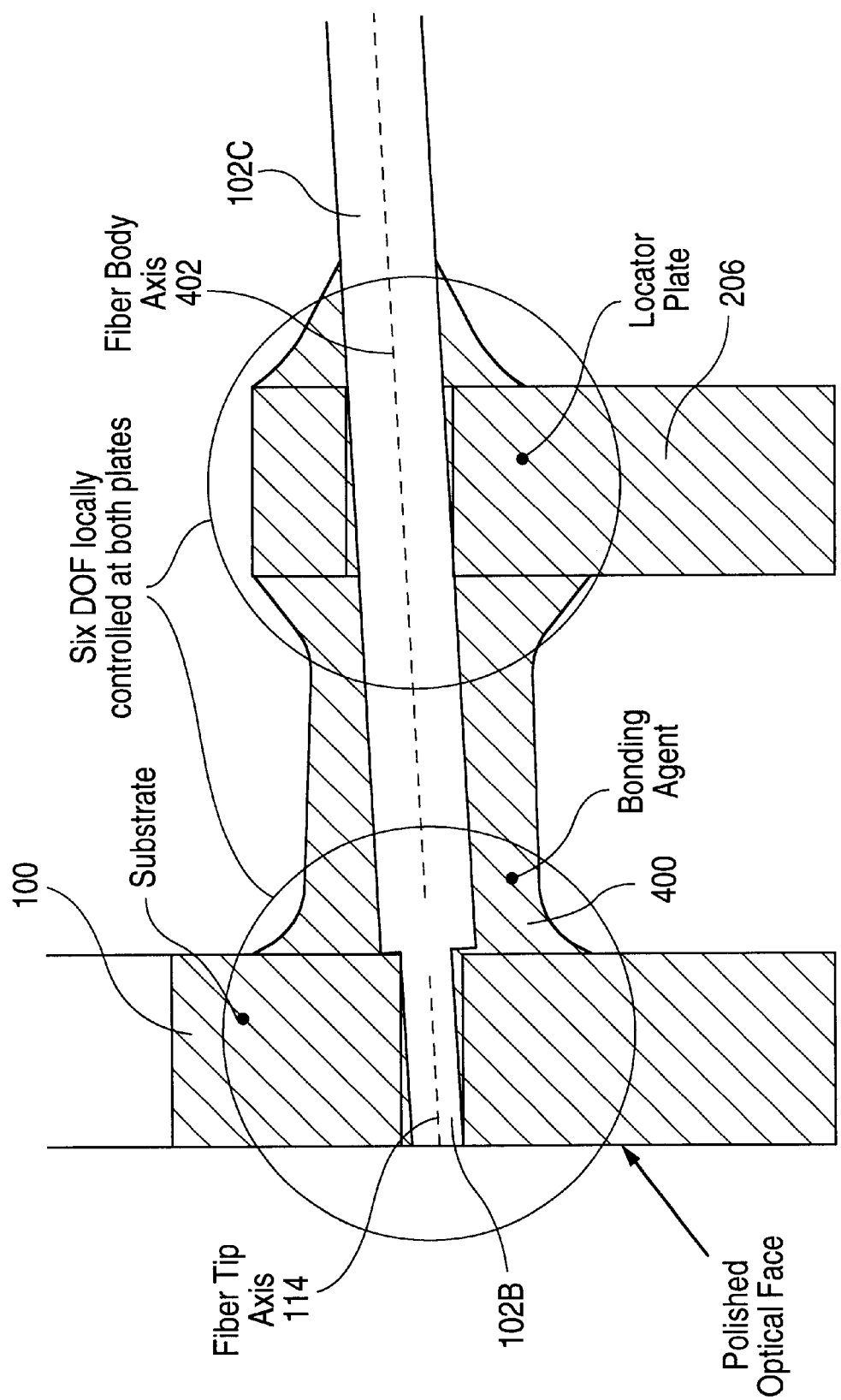
FIG. 4 illustrates one embodiment of a bonding process involving the substrate, the locator plate and the fiber body in FIG. 2.

FIG. 4 illustrates one embodiment of a bonding process involving the substrate 100, the locator plate 206 and the fiber body 102C in FIG. 2. In one embodiment, the fiber tip 102B is bonded to the substrate 100, and the fiber body 102C is bonded to the locator plate 206 by a bonding agent 400. The bonding process may involve any suitable bonding agent and bonding process. In one embodiment, the bonding process uses a bonding agent that is stable and adapted to withstand certain environmental conditions. In one embodiment, the bonding process comprises ultraviolet cured epoxies. Some suitable bonding processes are described in the U.S. patent application, entitled "HIGH DENSITY FIBER TERMINATOR/CONNECTOR." After the bonding process and a curing process, the alignment fixture 214 may be removed. After the bonding process, the substrate 100, the fiber tip 102B and body 102C and the locator plate 206 may be referred to as a "fiber termination."

After the bonding process, the degrees of freedom of the fiber tip 102B and body 102C controlled by the substrate 100 and/or locator plate 206 may be different. After the bonding process, the substrate 100 may locally control all six degrees of freedom. Similarly, the locator plate 206 may locally control all six degrees of freedom after the bonding process.

After the bonding process, the locator plate 206 may provide other functions, such as strain isolation or buffering of the fiber tip 102B. By constraining all degrees of freedom of the fiber at the locator plate 206 after bonding, the fiber body 102C may tolerate loads of any direction applied to the fiber body 102C to the right of the locator plate 206. The bonding process may fulfill desired constraint conditions of the fiber tip 102B and/or the fiber body 102C and remove significant elastic modes shown in FIGS. 3E–3F.

In one embodiment, any external loads (e.g., gravity) applied to the right end of the fiber body 102C after the alignment fixture 214 is removed will not induce any strain at the fiber tip 102B, at least not a first order strain. Thus, no local curvature or stress-induced birefringence will affect the light coupling efficiency of the fiber tip 102B. A local curvature or stress-induced birefringence would likely change the light diffractive properties of a glass medium, such as the fiber tip 102B.

In one embodiment, the elongated holes in the substrate 100 and the locator plate 206 set the position and angle of the fiber tip 102B to a high accuracy regardless of how the bonding agent may distort with time. In an embodiment where the substrate 100, the locator plate 206 and the connector plate 202 are made of silicon, the substrate 100, the locator plate 206 and the connector plate 202 form stable points for fiber location because silicon exhibits a low coefficient of thermal expansion (CTE) and negligible creep.

After the bonding process, a part of the fiber tip 102B that protrudes from the substrate face 104 may be removed by one or more processes, as described in the U.S. patent application, entitled "HIGH DENSITY FIBER TERMINATOR/CONNECTOR."The optical face 104 of the substrate 100 (FIG. 1) and the ends 102A of all fiber tips 102B mounted in the substrate 100 may be simultaneously polished.

In addition, a coating, such as an anti-reflection coating, may be applied to the substrate surface 104. Examples of coatings are described in the U.S. patent application, entitled "HIGH DENSITY FIBER TERMINATOR/ CONNECTOR." The fiber tip 102B in FIG. 4 may conduct light to and from free space or a component on the left of the fiber tip 102B. The devices described herein may be used in free space or wave guide optical systems.

Figure 5A:
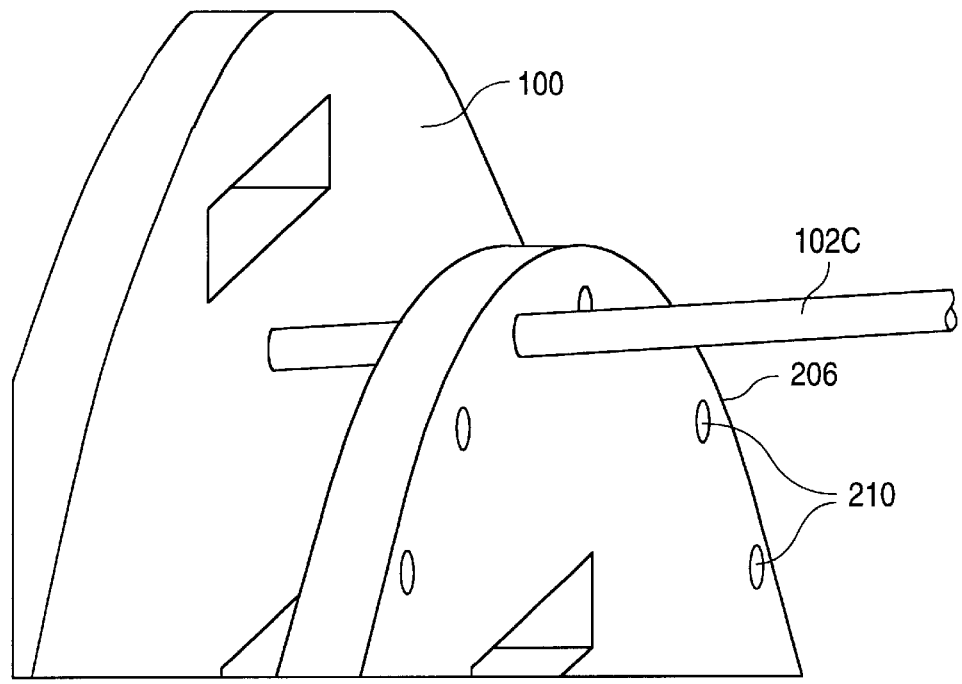
FIG. 5A illustrates one embodiment of the substrate, the fiber body and the locator plate in FIG. 2.
Figure 5B:
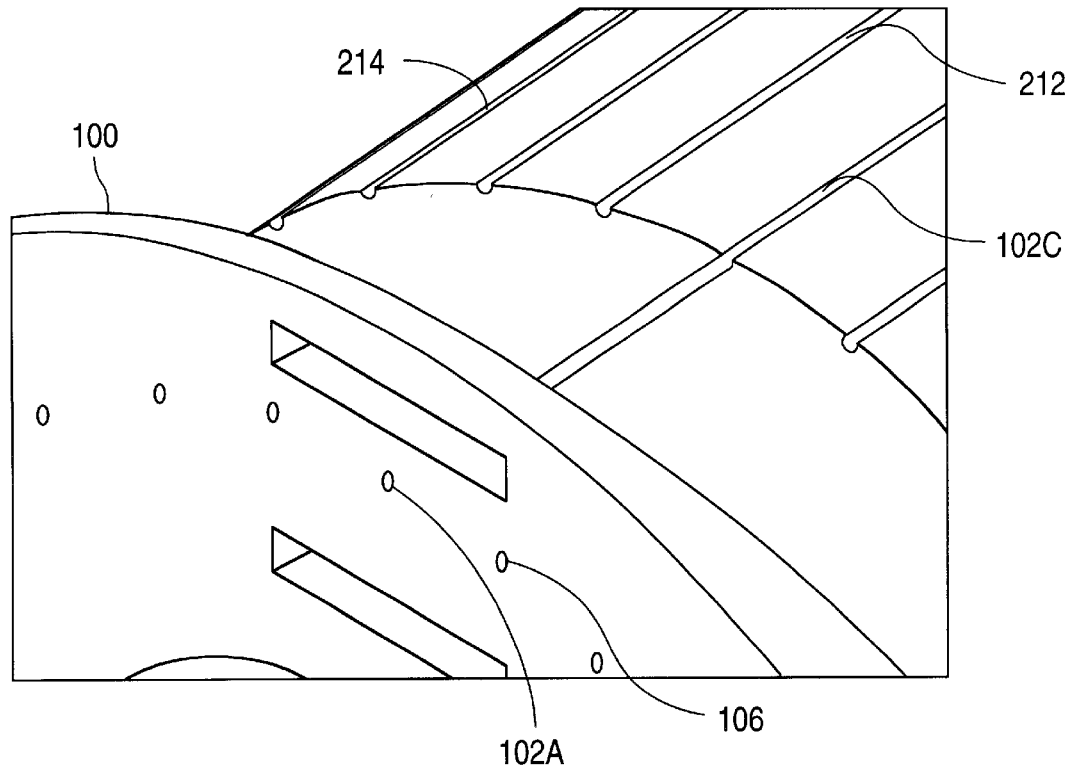
FIG. 5B illustrates one embodiment of the substrate, the fiber body and the alignment fixture in FIG. 2.

FIG. 5A illustrates one embodiment of the substrate 100, the fiber body 102C and the locator plate 206 in FIG. 2. FIG. 5B illustrates one embodiment of the substrate 100, the fiber body 102C and the alignment fixture 214 in FIG. 2. As shown in FIGS. 5A and 5B, the substrate 100, locator plate 206 and alignment fixture 214 may comprise a plurality of holes to support a plurality of fiber bodies, such as the fiber body 102C shown in FIGS. 5A and 5B.

Also shown in FIGS. 5A and 5B, the substrate 100, the locator plate 206 and the alignment fixture 214 may be circular in shape. In other embodiments, the substrate 100, the locator plate 206 and the alignment fixture 214 may comprise other shapes, such as oval or rectangular.

Figure 6:
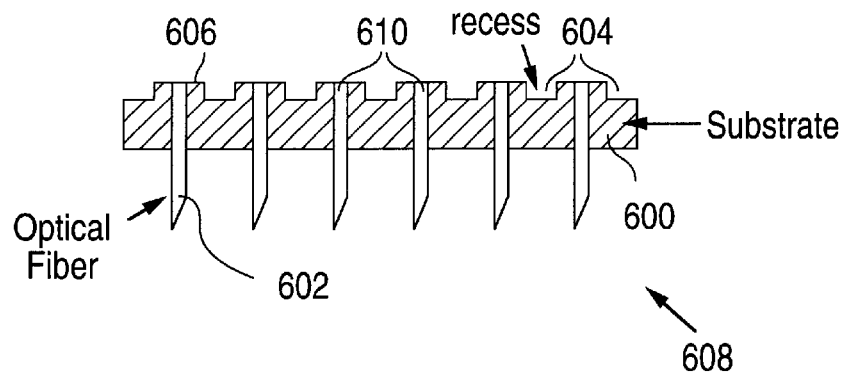
FIG. 6 illustrates one embodiment of a substrate, such as the substrate in FIG. 2, with a plurality of etched holes and a plurality of recesses formed on one side of the substrate.

FIG. 6 illustrates one embodiment of a fiber termination or substrate 608, such as the substrate 100 in FIG. 2, with a plurality of etched holes 610 and a plurality of recesses 604 formed on one side 606 of the substrate 600. The holes 610 are etched with one or more processes as described the U.S. patent application, entitled "HIGH DENSITY FIBER TERMINATOR/CONNECTOR." Each hole 610 in FIG. 6 may comprise an elongated hole as described above with reference to FIGS. 1A and 1B. Thus, FIG. 6 may be a cross-sectional view where the tip of each fiber 602 is at an angle coming out of the page.

The recesses 604 are formed by removing material from selected parts of the 'front' face or side 606 of the substrate 600. The recesses 604 may be formed by wet etching, plasma etching, laser ablation, sand blasting or some other suitable method. In one embodiment, substrate material is removed everywhere on the front side 606 of the substrate 600 except a ring of substrate material around each hole 610. In one embodiment, the recesses 604 are formed before a plurality of fibers 602 are inserted in the holes 610.

In one embodiment, after the fibers 602 are inserted in the holes 610, the front side 606 of the substrate 600 and the ends of the fibers are polished. With the recesses 604 on the front side 606, a relatively small amount of substrate material (e.g., the rings) located around the fibers 602 is polished with the fiber ends. Thus, the substrate 600 with recesses 604 allows more uniform polishing of the ends of the fibers 602 and less wear of the polishing surface.

In addition, the substrate 600 with recesses 604 facilitates the physical connection of two fiber connectors, as shown in FIGS. 10 and 11 in the U.S. patent application, entitled "HIGH DENSITY FIBER TERMINATOR/ CONNECTOR." When pressure is applied between the two connectors, the pressure is located near the fiber ends to provide low insertion loss.

Figure 7:
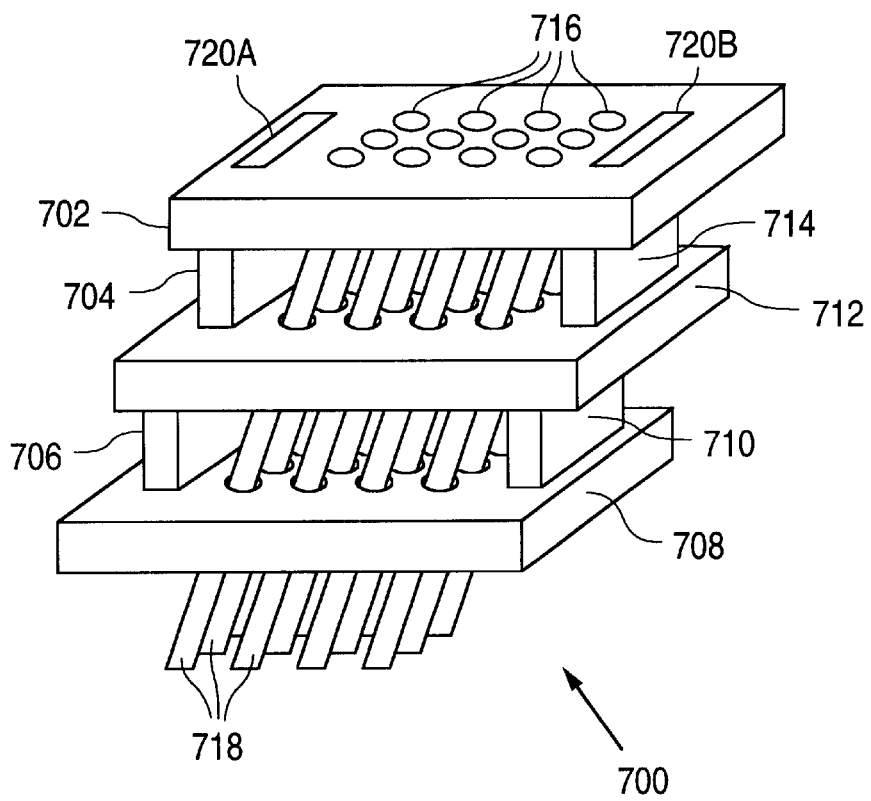
FIG. 7 illustrates one embodiment of an angled fiber array with a plurality of fibers.

FIG. 7 illustrates one embodiment of an angled fiber array 700 with a plurality of fibers 718. The angled fiber array 700 comprises a plurality of micromachined structures. In one embodiment, the angled fiber array 700 comprises a first layer 702, a second layer 712 and a third layer 708. In other embodiments, there are less than three or more than three layers. The layers 702, 712, 708 are held together by connector plates 704, 706, 714 and 710 that are glued, bonded or otherwise attached to the layers 702, 712, 708.

The fibers 718 may be arranged in any desired pattern and with any desired angle by configuring (1) the size of the holes in the layers 702, 712 and 708, (2) the shape of the holes in the layers 702, 712 and 708, (3) the horizontal position of the layers 702, 712, 708, and (4) the distance between each layer 702, 712, 708. The fibers 718 may be arranged at the same angle as shown in FIG. 7 or at different angles.

In a device with multiple fibers, such as the substrate 100 in FIG. 5A, a plurality of fiber ends 102A (FIGS. 1A and 1B) may be simultaneous polished by polishing one face of the substrate through which all fiber ends protrude. Polishing multiple fiber ends provides accurate positioning of the fiber tip face normal to the optical face 104 of the substrate 100 (i.e., the fiber tip face 102A and the substrate surface 104 are coincident). The optical face 104 of the substrate 100 may be the last degree of freedom (direction 2 in FIG. 2) used to completely define the location of the fiber tip face. Angle polishing each fiber face may greatly reduce back-reflection. The polishing, in conjunction with lithographic micromachining fabrication, may be scaled to large devices.

The above-described embodiments of the present invention are merely meant to be illustrative and not limiting. Various changes and modifications may be made without departing from the invention in its broader aspects. The appended claims encompass such changes and modifications within the spirit and scope of the invention.

What is claimed is:

1. An optical fiber assembly comprising a substrate with at least one hole formed in the substrate, the hole comprising a non-circular opening, the hole configured to receive a tip of a fiber such that an angle between an axis of the fiber tip and a normal of a surface of the substrate is greater than zero.

2. The optical fiber assembly of claim 1, wherein the hole is configured to control a lateral position of the fiber tip.

3. The optical fiber assembly of claim 1, wherein the angle is greater than three degrees.

4. The optical fiber assembly of claim 1, wherein the hole comprises at least two points configured to control a position of the fiber tip.

5. The optical fiber assembly of claim 1, wherein a shape of the non-circular opening in the substrate comprises two semicircles and an elongated portion adjoining the two semicircles.

6. The optical fiber assembly of claim 1, wherein the hole in the substrate is fabricated with a lithographic micromachining process.

7. The optical fiber assembly of claim 1, wherein the hole in the substrate controls at least five degrees of freedom of the fiber tip.

8. The optical fiber assembly of claim 1, wherein a height of the non-circular opening is equal to a diameter of the fiber tip plus a product of a thickness of the substrate and a tangent of a desired angle between an axis of the fiber tip and the surface normal of the substrate.

9. The optical fiber assembly of claim 1, further comprising a second structure positioned to one side of the substrate, the second structure configured to control a lateral position of a body of the fiber to one side of the substrate.

10. The optical fiber assembly of claim 9, wherein the second structure comprises a hole formed in the second structure, the hole comprising at least two control points configured to control displacement of the fiber body.

11. The optical fiber assembly of claim 10, wherein a shape of at least one opening of the hole in the second structure comprises two semicircles and an elongated portion adjoining the two semicircles.

12. The optical fiber assembly of claim 10, wherein the hole in the second structure controls at least two degrees of freedom of the fiber body.

13. The optical fiber assembly of claim 9, wherein the second structure is configured to apply a load to the fiber body, the load causing the fiber tip to contact at least two points of the substrate.

14. The optical fiber assembly of claim 9, wherein a position of the second structure is configured to cause the fiber tip to elastically deflect in a hole in the substrate as a fiber is translated through the second structure.

15. The optical fiber assembly of claim 9, wherein the second structure is configured to remove an undesired elastic deflection of the fiber body.

16. The optical fiber assembly of claim 9, further comprising a third structure located to one side of the second structure, the third structure configured to control a lateral position of the fiber body and an angle between an axis of the fiber body and the surface normal of the substrate.

17. The optical fiber assembly of claim 16, wherein the third structure comprises a removable alignment structure.

18. The optical fiber assembly of claim 16, wherein the third structure controls at least four degrees of freedom of the fiber body.

19. The optical fiber assembly of claim 9, further comprising a bonding material, the bonding material configured to bond the fiber to the substrate and the second structure.

20. The optical fiber assembly of claim 19, wherein the bonding material fills a space defined by the substrate and the second structure.

21. The optical fiber assembly of claim 19, wherein the substrate, the second structure, and the bonding material control substantially all rigid body motion and bending of the fiber.

22. The optical fiber assembly of claim 1, wherein the substrate is configured to support a plurality of fibers.

23. The optical fiber assembly of claim 9, such that the fiber tip makes contact with the hole in the first substrate at two points.

24. A method of supporting at least one optical fiber, the method comprising:

inserting a tip of the fiber into a hole in a first substrate, the hole having an opening with an area greater than a fiber tip diameter; and applying a load to a body of the fiber such that an axis of the fiber tip is at a pre-determined angle with respect to a normal of a surface of the first substrate.

25. The method of claim 24, wherein the angle is greater than three degrees.

26. The method of claim 24, further comprising forming the hole in the hole comprising at least two points configured to control displacement of the fiber tip.

27. The method of claim 25, wherein forming the hole comprises a lithographic micromachining process.

28. The method of claim 24, wherein a shape of the hole in the first substrate comprises two semicircles and an elongated portion adjoining the two semicircles.

29. The method of claim 24, wherein a height of the hole is equal to a diameter of the fiber tip plus a product of a thickness of the first substrate and a tangent of a desired angle between an axis of the fiber tip and the surface normal of the first substrate.

30. The method of claim 24, wherein applying a load to the fiber body comprises translating a portion of the fiber body through a hole in a second structure positioned to one side of the first substrate, the second structure configured to control a lateral position of the fiber body to one side of the first substrate, the hole comprising at least two control points configured to control displacement of the fiber body.

31. The method of claim 30, wherein a position of the second structure is configured to cause the fiber tip to elastically deflect in the hole in the first substrate as a fiber body is translated through the second structure.

32. The method of claim 30, wherein applying a load to the fiber body further comprises translating a portion of the fiber body along a third structure located to one side of the second structure, the third structure configured to control a lateral position of the fiber body and an angle between an axis of the fiber body and the surface normal of the first substrate.

33. The method of claim 30, further comprising bonding the fiber to the first substrate and the second structure.

34. The method of claim 24, further comprising bonding the fiber to the first substrate.

35. The method of claim 24, further comprising removing a portion of the fiber that protrudes from the surface of the first substrate.

36. The method of claim 24, further comprising polishing the surface of the first substrate and an end of the fiber tip.

37. The method of claim 24, wherein the fiber tip bears on one edge of the hole at one surface and another edge of the hole at another surface of the first substrate to constrain the axis of the fiber tip to be at an pre-determined angle with respect to the normal of a surface of the first substrate.

* * * * *